US012646768B2

(12) United States Patent
Byrd et al.

(10) Patent No.: US 12,646,768 B2
(45) Date of Patent: Jun. 2, 2026

(54) ENERGY STORAGE SYSTEM, COOLING SYSTEM, AND RELATED METHOD

(71) Applicant: Caterpillar Inc., Peoria, IL (US)

(72) Inventors: Jeremy Byrd, West Lafayette, IN (US); Gregory S. Hasler, Pekin, IL (US); John M. Tanner, Dunlap, IL (US); Sampathkumar Nachimuthu, Bangalore (IN); Dachuan Yu, Dunlap, IL (US); Eric A. Miller, Dunlap, IL (US); Gregory J. Davis, Griffin, GA (US); Craig P. Hittle, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 534 days.

(21) Appl. No.: 18/303,223

(22) Filed: Apr. 19, 2023

(65) Prior Publication Data

US 2024/0178487 A1 May 30, 2024

(30) Foreign Application Priority Data

Nov. 29, 2022 (IN) .............................. 202211068515

(51) Int. Cl.
*H01M 10/667* (2014.01)
*H01M 10/613* (2014.01)
*H01M 10/63* (2014.01)
*H01M 10/6563* (2014.01)

(52) U.S. Cl.
CPC ....... *H01M 10/667* (2015.04); *H01M 10/613* (2015.04); *H01M 10/63* (2015.04); *H01M 10/6563* (2015.04)

(58) Field of Classification Search
CPC .. H01M 10/667; H01M 10/613; H01M 10/63; H01M 10/6563
See application file for complete search history.

(56) References Cited

U.S. PATENT DOCUMENTS

| 11,251,649 B2 | 2/2022 | Livingston | |
| 2019/0098777 A1* | 3/2019 | Nakatsu ................. | H02M 7/003 |
| 2020/0243813 A1 | 7/2020 | Zhang et al. | |

FOREIGN PATENT DOCUMENTS

| CN | 106505689 A | 3/2017 |
| CN | 206283290 U | 6/2017 |
| CN | 111092379 A | 5/2020 |
| CN | 211530802 U | 9/2020 |
| CN | 216904310 U | 7/2022 |
| EP | 3644395 A1 | 4/2020 |

* cited by examiner

*Primary Examiner* — Olatunji A Godo

(74) *Attorney, Agent, or Firm* — Bookoff McAndrews

(57) ABSTRACT

An energy storage system may include a storage container having an enclosed compartment containing one or more energy storage units and an enclosed compartment duct, an inverter cabinet containing an inverter, the inverter cabinet having one or more inverter cabinet inlets, and an inverter exhaust duct. The storage container may also have a transformer bay containing a transformer. The energy storage system may also include an air temperature control unit, attached to the storage container and configured to circulate conditioned air to the enclosed compartment via the enclosed compartment duct and to the inverter cabinet via the one or more inverter cabinet inlets, and to return air from the enclosed compartment and the inverter cabinet via an air temperature control unit return.

20 Claims, 8 Drawing Sheets

700

START AIR FLOW OF
CONDITIONED AIR
FROM AIR TEMPERATURE
CONTROL UNIT
705

CIRCULATE CONDITIONED
AIR TO ENCLOSED
COMPARTMENT VIA ENCLOSED
COMPARTMENT DUCTS
710

CIRCULATE CONDITIONED
AIR TO INVERTER
COMPARTMENT VIA
INVERTER DUCT
715

RETURN AIR
TO AIR TEMPERATURE
CONTROL UNIT
VIA RETURN
720

ENERGY STORAGE SYSTEM, COOLING SYSTEM, AND RELATED METHOD

CROSS-REFERENCE TO RELATED APPLICATION(S)

This application claims the benefit of priority to Indian Provisional Patent Application No. 202211068515, filed on Nov. 29, 2022, the entirety of which is incorporated herein by reference.

TECHNICAL FIELD

The present disclosure relates generally to an energy storage system and a related cooling system and method, and, in particular, to an energy storage system having a cooling system for managing a thermal load of one or more energy sources, one or more power electronics, and one or more transformers, all located within an energy storage container, and a related method.

BACKGROUND

Energy storage systems are used in commercial and industrial applications for peak shaving, load shifting, emergency backup, and various grid services. Energy storage systems include back-up energy sources (or energy sources), such as lithium ion batteries, used in various applications, such as remote constructions sites, remote medical facilities, or in vehicles. Energy storage systems may also include power electronics, such as an inverter. The energy sources and the power electronics are stored in a housing, such as an industrial container, to prevent internal components from corroding due to humid ambient conditions. The energy sources and the power electronics generate large amounts of heat during use, and therefore, these components need cooling systems to provide thermal management, e.g., cooling of air or coolant around the energy sources and the power electronics, because the energy sources and/or the power electronics may not function properly outside a given temperature range. For example, the energy sources and/or the power electronics may shutdown due to overheating. And, in extreme temperature and humidity conditions, the energy sources and/or the power electronics may be damaged. That is, energy storage systems having energy sources and power electronics require efficient and effective thermal management for safe and reliable operation of those components.

Energy storage systems may also include one or more transformers to provide a desired voltage output for a user. Transformers also need efficient and effective thermal management for safe and reliable operation. Transformers are usually located outside of the container and separate from a compartment containing the back-up energy source and the power electronics, to prevent heat output by the transformers from detrimentally affecting the thermal management of the back-up energy sources and power electronics. If a relatively large transformer, such as a 208 V transformer, is included as part of an energy storage system, costs for manufacturing and shipping the energy storage system are relatively high due to the relatively large size and weight of the transformer and the relatively large sized container needed to store same.

Such energy storage containers need cooling systems capable of providing efficient thermal management to back-up energy storage and power electronics. Further, such energy storage containers may be located and operate within a wide range of temperatures, e.g., in extreme temperature conditions, and, therefore, need cooling systems capable of efficient thermal management in such conditions.

CN216904310U ("the 310 patent") discusses a container energy storage system comprising a container shell housing a power supply area, including a battery cluster and a fire-fighting cabinet, and a control area, including an energy storage converter and a host computer. An air conditioner module is arranged outside of the container shell, and provides cool air to the power supply area. The container energy storage system of the '310 patent does not, however, provide an efficient thermal management system to be used for both a back-up energy storage and power electronics, while also providing for transformers and one or more connections for a user.

There is a need, therefore, for an energy storage system of minimized size and cost, and that is capable of storing back-up energy sources, power electronics, cooling systems, and transformers, while also providing a cooling system capable of efficient and effective thermal management to each of the various elements stored therein, to prevent shutting down and/or damage to those elements. And, with respect to transformers provided in such energy storage systems, there is a need for improved serviceability by providing a desired number of taps for a user.

The energy storage system, cooling system, and method of the present disclosure may solve one or more of the problems set forth above and/or other problems in the art. The scope of the current disclosure, however, is defined by the attached claims, and not by the ability to solve any specific problem.

SUMMARY

In one aspect of the present disclosure, an energy storage system comprises a storage container having an enclosed compartment containing one or more energy storage units and an enclosed compartment duct, an inverter cabinet containing an inverter, the inverter cabinet having one or more inverter cabinet inlets, and an inverter exhaust duct. The storage container also has a transformer bay containing a transformer. In addition, the energy storage system comprises an air temperature control unit, attached to the storage container and configured to circulate conditioned air to the enclosed compartment via the enclosed compartment duct and to the inverter cabinet via the one or more inverter cabinet inlets, and to return air from the enclosed compartment and the inverter cabinet via an air temperature control unit return.

In another aspect of the present disclosure, a method of controlling a temperature of an energy storage system is provided. The energy storage system comprises a storage container having an enclosed compartment containing one or more energy storage units and an enclosed compartment duct, an inverter cabinet containing an inverter, the inverter cabinet having one or more inverter cabinet inlets, and an inverter exhaust duct. The energy storage container also has a transformer bay containing a transformer. In addition, the energy storage system has an air temperature control unit, attached to the storage container and configured to circulate conditioned air to the enclosed compartment via the enclosed compartment duct and to the inverter cabinet via the one or more inverter cabinet inlets, and to return air from the enclosed compartment and the inverter cabinet via an air temperature control unit return. The method comprises starting flow of the conditioned air from the air temperature control unit, circulating the conditioned air through the enclosed compartment via the enclosed compartment duct, circulating the conditioned air through the inverter cabinet via the one or more inverter cabinet inlets, and returning air that has passed through the one or more energy storage units in the enclosed compartment and air that has passed through the inverter cabinet and is exhausted by the inverter exhaust duct to the air temperature control unit via the air temperature control unit return.

In yet another aspect of the present disclosure, a cooling system is provided for an energy storage system, the energy storage system having an enclosed compartment containing one or more energy storage units and an inverter cabinet containing an inverter, and a transformer bay containing a transformer. The cooling system comprises an air temperature control unit, attached to the storage container and configured to output conditioned air and to return air from the enclosed compartment, an enclosed compartment duct, located in the enclosed compartment near the one or more energy storage units, and configured to receive the conditioned air from the air temperature control unit, one or more inverter cabinet inlets, located on a side of the inverter cabinet and configured to receive the conditioned air from the air temperature control unit, an inverter exhaust duct, located above the inverter cabinet, and configured to exhaust air from within the inverter cabinet back into the enclosed compartment, and an air temperature control unit return, configured to return air that has circulated through the one or more energy storage units in the enclosed compartment and air output by the inverter exhaust duct to the air temperature control unit.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion, such that a process, method, article, or apparatus that comprises a list of elements does not include only those elements, but may include other elements not expressly listed or inherent to such a process, method, article, or apparatus. In addition, in this disclosure, relative terms, such as, for example, "about," "generally, "substantially," and "approximately" are used to indicate a possible variation of ±10% in the stated value.

Figure 1:
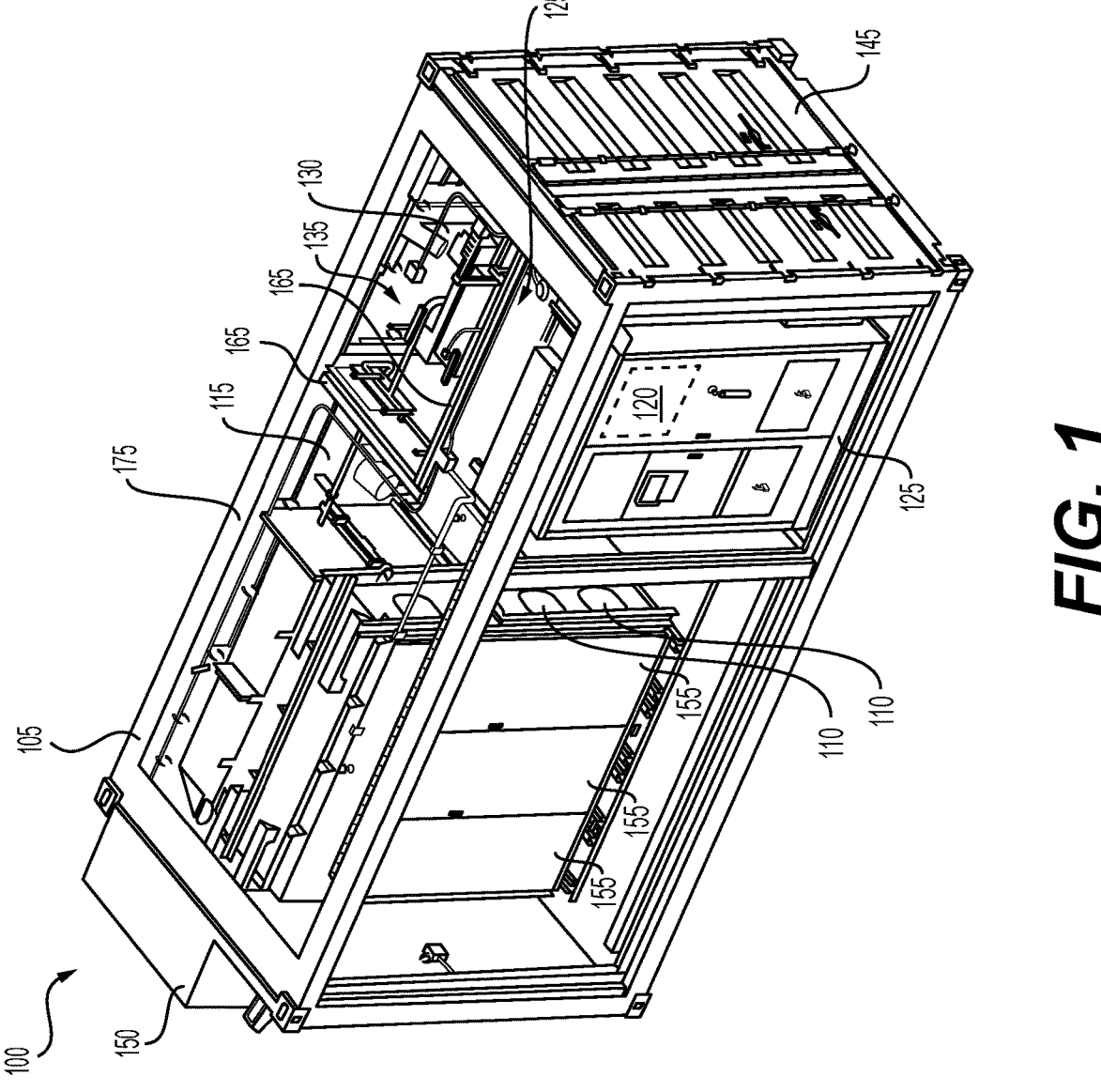
FIG. 1 shows a perspective view of an energy storage system, including a storage container that stores an energy source, power electronics, and a transformer, in accordance with the present disclosure.

FIG. 1 shows a view of an energy storage system 100 of the present disclosure. The energy storage system 100 includes an energy storage container 105 (hereinafter, storage container 105) that houses one or more energy sources 110 (or energy storage units) and an inverter 120 within an enclosed compartment 115. The inverter 120 may be stored within an inverter cabinet 125. The storage container 105 also houses a transformer 130 within a transformer bay 135. The storage container 105 may have a length of about 37.9 feet, a width of about 8.75 feet, and a height of about 13 feet.

The energy sources 110 may be batteries, such as lithium ion batteries having chemistries including lithium cobalt oxide (LCO), lithium nickel cobalt aluminum oxide (NCA), lithium nickel manganese cobalt oxide (NMC), and lithium iron phosphate (LFP), lead acid batteries, flow batteries, sodium nickel chloride batteries, and lithium iron batteries, stored in one or more storage racks 155 within the enclosed compartment 115. For example, the energy sources 110 may be stored in four racks or six racks 155. The inverter 120 may be, for example, a bi-directional power (BDP) inverter. The transformer 130 provides isolation from harmonics created by the conversion process of the inverter 120. The transformer 130 may be, for example, a step down transformer, which reduces a nominal inverter voltage, or a step up transformer, which increases a nominal inverter voltage. For example, the transformer 130 may be a step down transformer, which reduces a nominal inverter voltage of 480 V to one of 415 V, 400 V, or 380 V. And, for example, the transformer may be a step up transformer, which increases a nominal inverter voltage of 480 V to 600 V or to 690 V. The transformer 130 is not, however, limited to these types of transformers, and may be another type of transformer 130.

The storage container 105 also has one or more connections 140 (shown in FIG. 2), provided on an exterior of the storage container 105. The one or more connections 140 include connections that output power from the transformer 130, and may provide one or more options for the output power, such as, for example, power in a range of about 0.5 megawatts (MW) to about 1.26 MW, and in particular, 0.5 MW, 0.84 MW, 1 MW, and/or 1.26 MW. The energy storage system 100 may also provide options for a user in terms of energy output, with energy output being in a range of about 0.44 megawatt-hours (MWh) to about 9 MWh, and in particular, 0.44 MWh, 0.67 MWh, 1.5 MWh, 3 MWh, 3.5 MWh, 4 MWh, 5.5 MWh, 6 MWh, 6.6 MWh, 8 MWh, 8.5 MWh, and/or 9 MWh. The storage container 105 may also have one or more doors 145 for access to the enclosed compartment 115, the inverter cabinet 125, and the transformer bay 135, for maintenance and operation purposes.

The energy storage system 100 also includes an air temperature control unit 150, such as a heating, ventilation, and air conditioning (HVAC) unit, attached to the energy storage container 105 at an end opposite the one or more doors 145. The air temperature control unit 150 may be end mounted, as shown in FIG. 1, although other arrangements of the air temperature control unit 150 may be used. As discussed in more detail below, the air temperature control unit 150 provides thermal management to the energy storage system 100, specifically by providing conditioned air to at least the enclosed compartment 115 and to the inverter cabinet 125.

The enclosed compartment 115 and the transformer bay 135 are separated by walls 165, which may be insulated. In addition, outer walls 175 of the enclosed compartment 115 may be insulated. That is, insulation (not shown) may be provided in the walls 165 and 175 of the enclosed compartment 115. The energy storage system 100 may be used in an environment with ambient temperature ranging from about −40° ° C. to about 50° C. and up to 100% relative humidity (RH). The energy storage system 100 may also be used in environments with elevations up to about 3,000 m (relative to sea level). In addition, the energy storage system 100 may be waterproof (e.g., an IP54 rated space).

Figure 2:
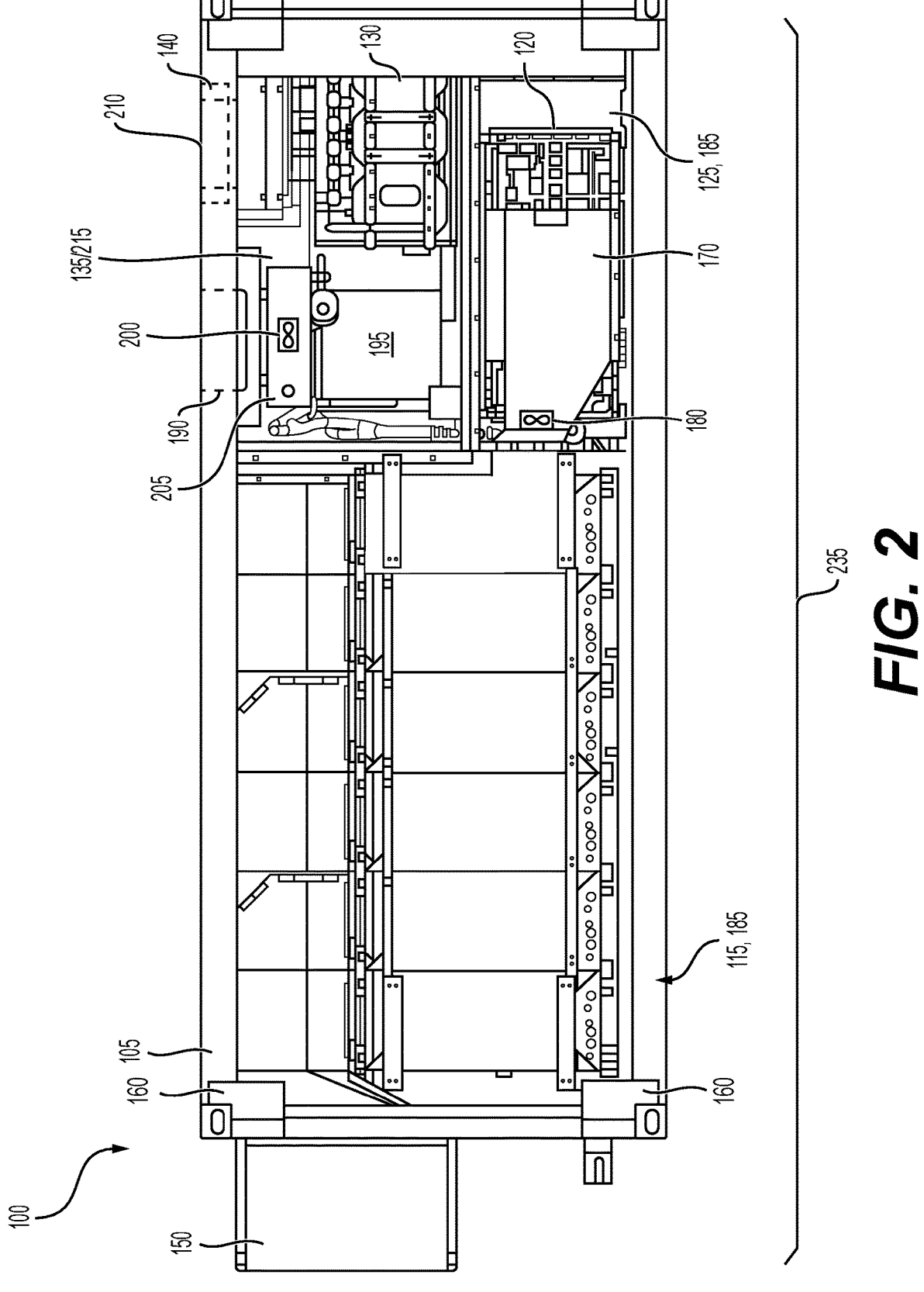
FIG. 2 shows a top view of the energy storage system shown in FIG. 1, including a schematic view of thermal management within the energy storage system.
Figure 8:
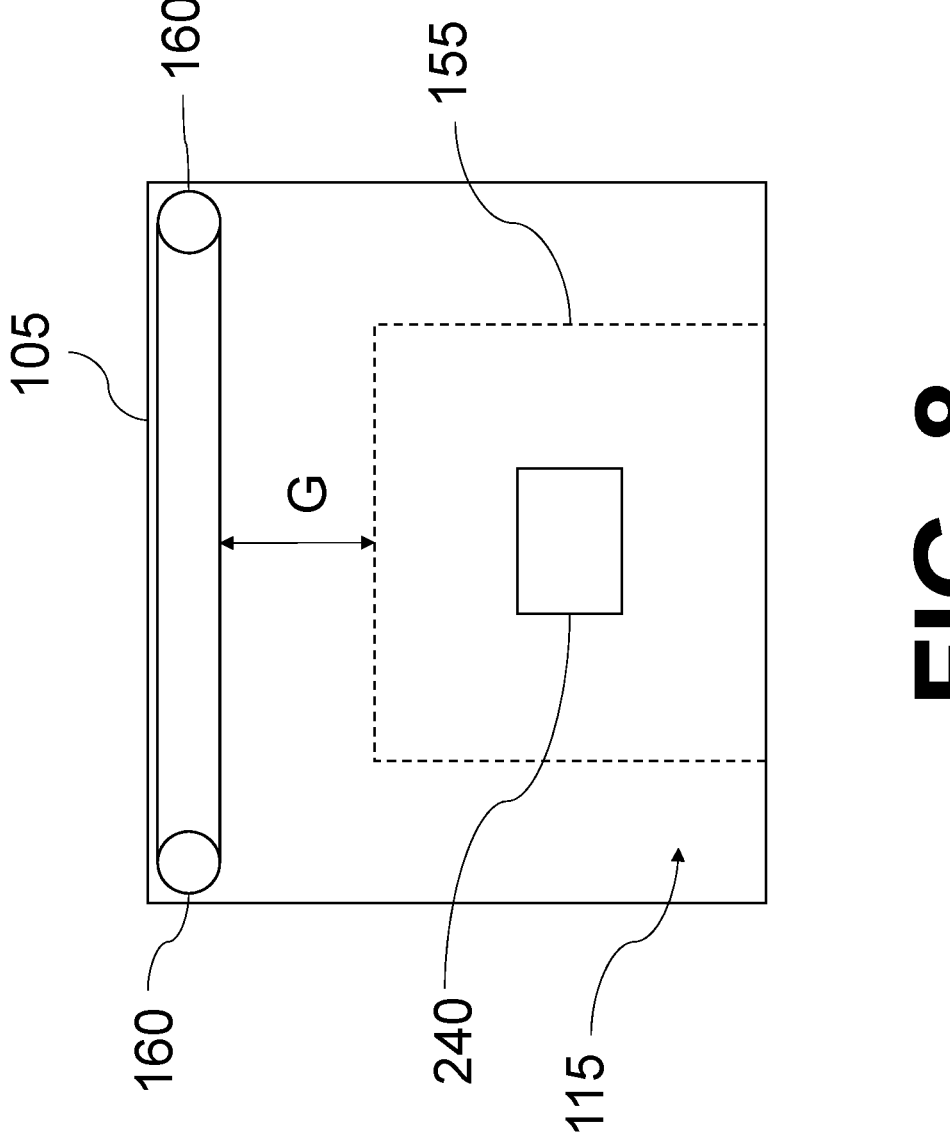
FIG. 8 shows a schematic view of an enclosed compartment of the energy storage unit, in accordance with the present disclosure.

FIG. 2 shows a top view of the energy storage system 100 shown in FIG. 1, including a view of thermal management within the energy storage system 100. In particular, FIG. 2 shows one or more enclosed compartment ducts 160, located within the enclosed compartment 115 that houses the one or more energy sources 110 (shown in FIG. 1) and the inverter cabinet 125. The one or more enclosed compartment ducts 160 may be located on or near an upper surface of the enclosed compartment 115, with a gap G being provided between the storage racks 155 and the ductwork within the enclosed compartment 115, as shown in FIG. 8. The enclosed compartment ducts 160 connect to and receive conditioned air from the air temperature control unit 150. By this arrangement and connection, the air temperature control unit 150 supplies conditioned air, such as cooled air, for example, to the enclosed compartment ducts 160, which, in turn, supply the conditioned air to the interior of the enclosed compartment 115.

With reference to FIG. 8, the gap G is shown as the space between the top of the racks 155 and the overhead ductwork, including the enclosed compartment ducts 160, within the enclosed compartment 115 of the storage container 105. The gap G may have a dimension within a range of about 200 mm to about 275 mm, or within a range of about 215 mm to about 260 mm. More specifically, the dimension of the gap G may be a height of the gap G. The enclosed compartment ducts 160 may have a dimension within a range of about 100 mm to about 260 mm, or within a range of about 115 mm to about 240 mm. More specifically, the dimension of the enclosed compartment ducts 160 may be a diameter of openings of the enclosed compartment ducts 160. FIG. 8 also shows an air temperature control unit return 240, discussed in more detail below with reference to FIGS. 3 and 4. The air temperature control unit return 240 may have a dimension of about 110 mm to about 190 mm, or within a range of about 135 mm to about 170 mm. More specifically, the dimension of the air temperature control unit return 240 may be a height of the air temperature control unit return 240. As noted above, in this disclosure, the relative term "about" is used to indicate a possible variation of ±10% in the stated value, including the values of the ranges listed above.

The gap G allows for a portion of the air that has circulated through the energy sources 110 in the battery racks 155 to recirculate within the enclosed compartment 116. Put another way, the gap G provides for air recirculation, and the particular size of the gap G provides for a recirculation ratio, which is a ratio of an amount of air that recirculates within the enclosed compartment to an amount of air supplied to the enclosed compartment 115 by the air temperature control unit 150. And, by virtue of the gap G above the storage racks 155 and below the enclosed compartment ducts 160, and by virtue of the recirculation ratio, at least a portion of the air that has passed around and through the energy sources 110 (that is, heated air) recirculates within the enclosed compartment 115, resulting in entrainment of excess heated air, and allowing for better mixing of the heated air with conditioned air output by the enclosed compartment ducts 160, prior to reentry into cooled components, including the energy sources 110, and into the inverter cabinet 125.

Figure 3:
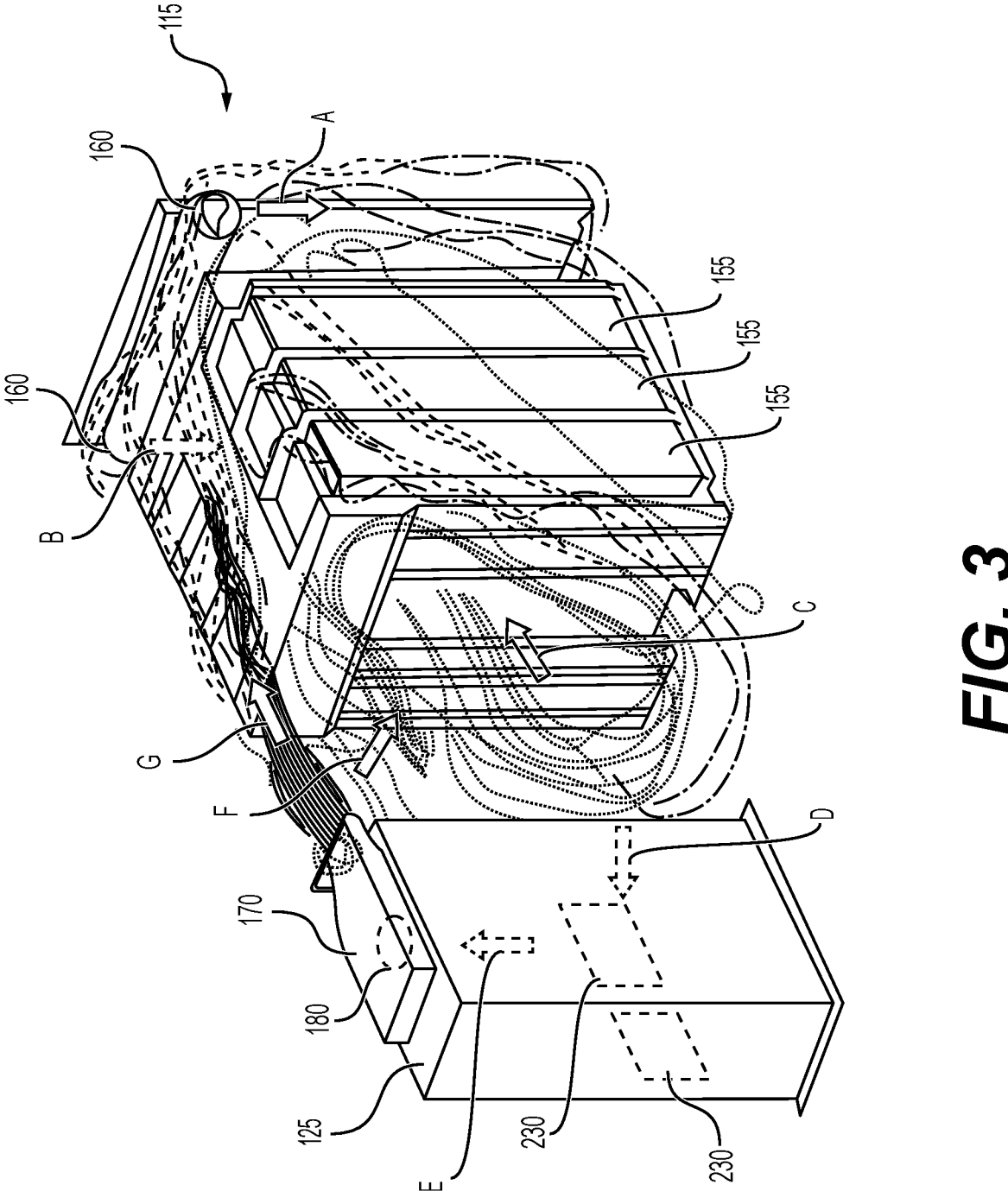
FIGS. 3 and 4 show schematic views of airflow in a conditioned space of the energy storage system shown in FIGS. 1 and 2.

With reference to FIG. 3, the inverter cabinet 125 has one or more inverter cabinet inlets, or openings, 230 on a side thereof. The inverter cabinet inlets 230 may contain filters (not shown) through which air passes. At least some of the air within the enclosed compartment 115 flows past the storage racks 155, into the inverter cabinet inlets 230, and enters the inverter cabinet 125. An exhaust fan 180, provided on an upper surface of the inverter cabinet 125, draws air from within the inverter cabinet 125 upward and through an inverter exhaust duct 170 provided on top of the inverter cabinet 125. The inverter exhaust duct 170 outputs the air from the inverter cabinet 125 back into the enclosed compartment 115. By this arrangement, conditioned air is supplied to the inverter cabinet 125 via the air temperature control unit 150, in order to cool the inverter 120. The enclosed compartment 115, containing the storage racks 155 and the inverter cabinet 125, forms a conditioned space, or a conditioned portion, 185 (FIG. 2) of the storage container 105, meaning that this compartment and the elements contained therein are subject to thermal management and/or temperature control by the air temperature control unit 150.

FIG. 2 also shows an intake louver 190 of the transformer bay 135, through which ambient air from outside of the storage container 105 may pass into the transformer bay 135, a radiator 205, a transformer bay fan 200 (which may be one or more fans), a transformer bay duct 195, and an exhaust louver 210, through which air from inside of the transformer bay 135 may be output to outside of the storage container 105. The exhaust louver 210 may be a gravity operated louver. As discussed in more detail below, with respect to FIGS. 5 and 6, the transformer bay fan 200 (shown near the intake louver 190 of the transformer bay 135, although it could also be in other locations) draws ambient air from outside of the storage container 105 through the intake louver 190, and into the transformer bay duct 195. The ambient air then flows through an outlet of the transformer bay duct 195 into the transformer bay 135 and is then output, or exhausted, from the transformer bay 135 via the exhaust louver 210. The transformer bay 135 forms an unconditioned space, or unconditioned portion 215 (FIG. 2) of the storage container 105, meaning the transformer bay 135 is not subject to thermal management and/or temperature control by the air temperature control unit 150. Put another way, the unconditioned space 215 is a space that is isolated from the conditioned air that has been supplied by the air temperature control unit 150.

The radiator 205 may be positioned in or near the intake louver 190, so that the ambient air drawn into the transformer bay duct 195 via the transformer bay fan 200 passes over the radiator 205 (more specifically, for example, over coils of the radiator 205). Air passing over the radiator 205 may, for example, cool a fluid, such as a coolant, flowing through the radiator 205, to provide additional cooling capacity to the energy storage system 100. The radiator 205 may be connected to a cooling system used to cool the inverter 120, for example (as a supplement to the conditioned air that is supplied to the inverter cabinet 125).

A cooling system 235 for the energy storage system 100 may be formed by several of the elements described above. For example, the cooling system 235 may include the air temperature control unit 150, the one or more enclosed compartment ducts 160, the inverter exhaust duct 170, the inverter exhaust fan 180, the intake louver 190, the exhaust louver 210, the transformer bay duct 195, the transformer bay fan 200, and/or insulation around the walls 165 of the enclosed compartment 115. The conditioned air from the air temperature control unit 150 may reach the storage racks 155 within the enclosed compartment 115 first, and the inverter cabinet 125 second.

Figure 4:
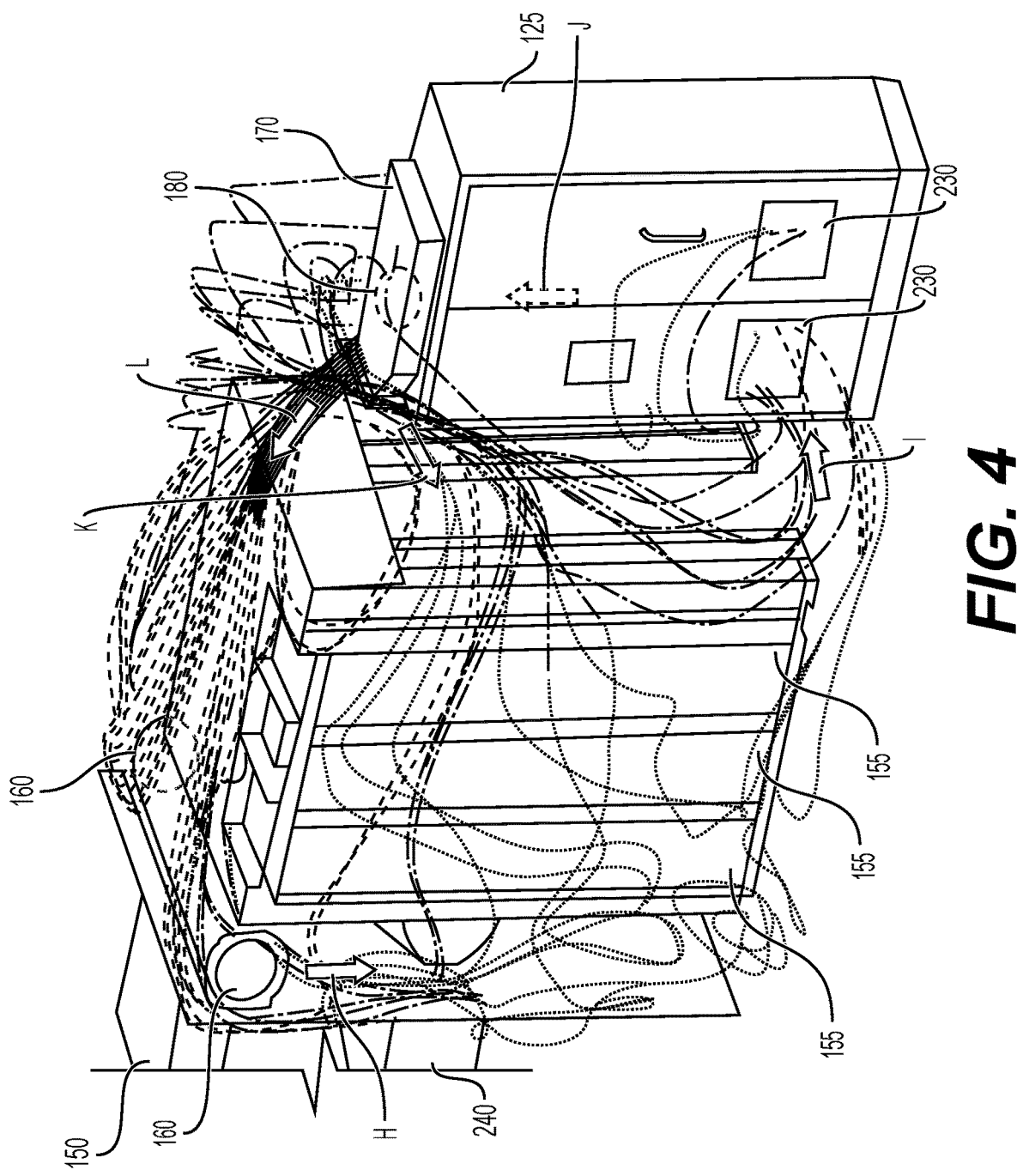

FIG. 3 shows a schematic diagram of air flow from the enclosed compartment ducts 160 through the enclosed compartment 115, to the storage racks 155 and to the inverter cabinet 125, as well as the return of air from the inverter exhaust duct 170 towards an air temperature control unit return 240 (FIGS. 4 and 8). The outer walls 175 of the enclosed compartment 115 are not shown in FIG. 3, in order to depict the air flow. Arrows A, B, C, D, E, and F in FIG. 3 indicate the directions of the overall air flow from the enclosed compartment ducts 160. The air flow is also shown by a series of lines, including, in order of decreasing air flow velocity: solid lines, long-dashed lines, short-dashed lines, dashed-dotted lines, and dotted lines. The air flow begins downward from the enclosed compartment ducts 160, shown by arrows A and B, and continues through the enclosed compartment 115, through and around the storage racks 155 containing the energy sources 110 (not shown). The velocity of the air may vary based on locations and speeds of fans in the system, and based on a temperature of the air, which changes as the air flows through the enclosed compartment 115. For example, as the air flows through and around the storage racks 155 to cool the energy sources 110, a temperature of the air may increase due to heat exchange with the energy sources 110 (that is, the air may absorb heat from the energy sources 110, thereby cooling the energy sources 110), and a velocity of the air flow at that point in time and at that location may increase. After having passed through and around the energy sources 110, some of the air flows back towards the air temperature control unit return 240 (FIGS. 4 and 8), as shown by arrow C. The air may flow back towards the air temperature control unit return 240 due to suction of an air temperature control unit fan (not shown), for example.

In addition, after having passed through and around the energy sources 110, some of the air flows into the inverter cabinet 125, as discussed above, via the one or more inverter cabinet inlets 230, as shown by arrow D. The exhaust fan 180 draws air upward, within the inverter cabinet 125, as shown by arrow E, into the inverter exhaust duct 170, which then outputs the air near the storage racks 155. At least some of the air output by the inverter exhaust duct 170 then flows towards the air temperature control unit return 240, shown by arrow F, due to the suction force of the air temperature control unit fan (not shown), and some of the air flows over the top of the storage racks 155, in the direction of arrow G, circulates around the racks 155, and flows back towards the air temperature control unit return 240.

FIG. 4 shows another schematic view of the same flow represented in FIG. 3, but from a different perspective, and, in particular, is another schematic diagram of the air flow from the air temperature control unit 150 through the enclosed compartment 115, to the storage racks 155 and the inverter cabinet 125, via the enclosed compartment ducts 160. As in FIG. 3, the outer walls 175 of the enclosed compartment 115 are omitted in FIG. 4 in order to depict the air flow. And, as in FIG. 3, the air flow is shown by both arrows, here, arrows H, I, J, and K, as well as a series of lines, including solid lines, long-dashed lines, short-dashed lines, dashed-dotted lines, and dotted lines, and arrows indicate the direction of the airflow.

The air flow begins from the enclosed compartment ducts 160, indicated by arrow H, and continues through the enclosed compartment 115, through the storage racks 155 containing the energy sources 110. The velocity of the air may vary based on locations and speeds of fans in the system, and based on a temperature of the air, which changes as the air flows through the enclosed compartment 115. For example, as the air flows through the energy sources 110, a temperature of the air may increase due to heat exchange with the energy sources 110 (that is, the air may absorb heat from the energy sources 110, thereby cooling the energy sources 110), and a velocity of the air flow at that point in time and at that location may increase.

And, as noted with respect to FIG. 3, after having passed through and around the energy sources 110, some of the air flows towards the inverter cabinet 125, as shown by arrow I, via the one or more inverter cabinet inlets 230. The exhaust fan 180 draws air upward within the inverter cabinet 125, as shown by arrow J, and into the inverter exhaust duct 170, which then outputs the air near the racks 155 containing the energy sources 110, as shown by a arrows K and L in FIG. 4. At least some of the air output by the inverter exhaust duct 170 then flows towards the air temperature control unit return 240, shown by arrow K, due to the suction force of the air temperature control unit fan (not shown), and some of the air flows over the top of the storage racks 155, in the direction of arrow L, circulates around the racks 155, and flows back towards the air temperature control unit return 240.

Figure 5:
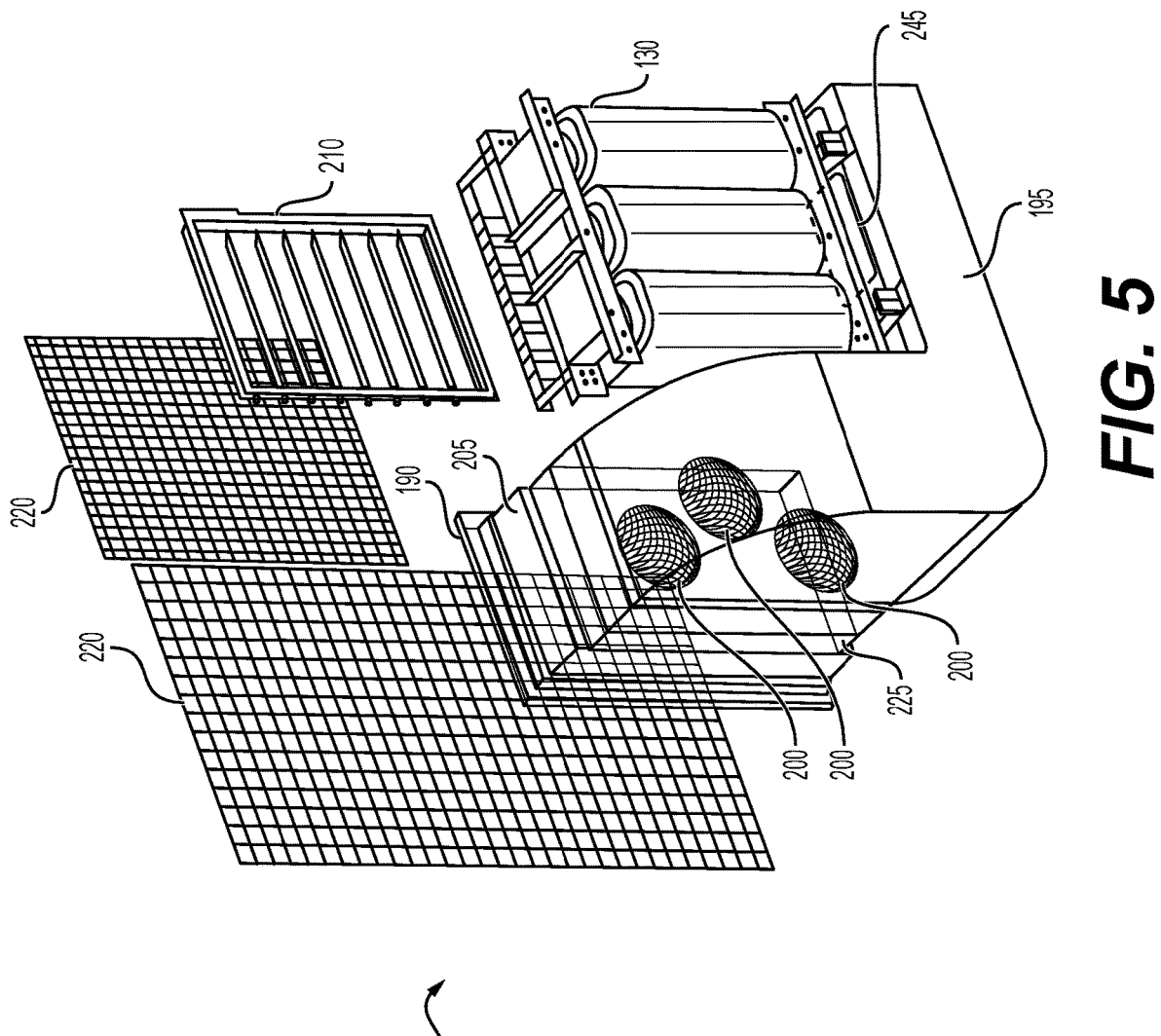
FIG. 5 shows a schematic view of the transformer bay of the energy storage system shown in FIGS. 1 and 2.

FIG. 5 shows a schematic view of the transformer bay 135 of the energy storage system 100. Specifically, FIG. 5 shows the intake louver 190, the radiator 205, the transformer 130, the transformer bay duct 195, the transformer bay fans 200 (in this example, there are three fans), and the exhaust louver 210. The transformer bay duct 195 includes an inlet near the intake louver 190 and the radiator 205, and extends downward, alongside and below the transformer 130, to an outlet 245. FIG. 5 also shows grates 220, which may be provided adjacent to the intake louver 190 and adjacent to the exhaust louver 210, to prevent foreign objects (e.g., debris, wildlife, etc.) from entering the transformer bay 135. The grates 220 may be installed in openings in the storage container 105, so that ambient air and air from within the transformer bay 135 can pass freely through the grates 220 and through the intake louver 190 and the exhaust louver 210. And, by virtue of the free passage of ambient air and air from within the transformer bay 135 through these elements, air pressure within the transformer bay 135 may be maintained at environmental, or atmospheric, pressure of about 101325 Pascals (Pa). FIG. 5 also shows a porous medium 225 which may be provided alongside the exhaust louver 210. The porous medium 225 may provide filtration of air as it exits the transformer bay duct 195.

By virtue of the arrangement of the transformer bay 135, noted above, it is possible to provide forced air cooling of the transformer 130, which allows for a higher power rating of the energy storage system 100, with smaller foot print than a system containing natural convection air cooled transformer.

Figure 6:
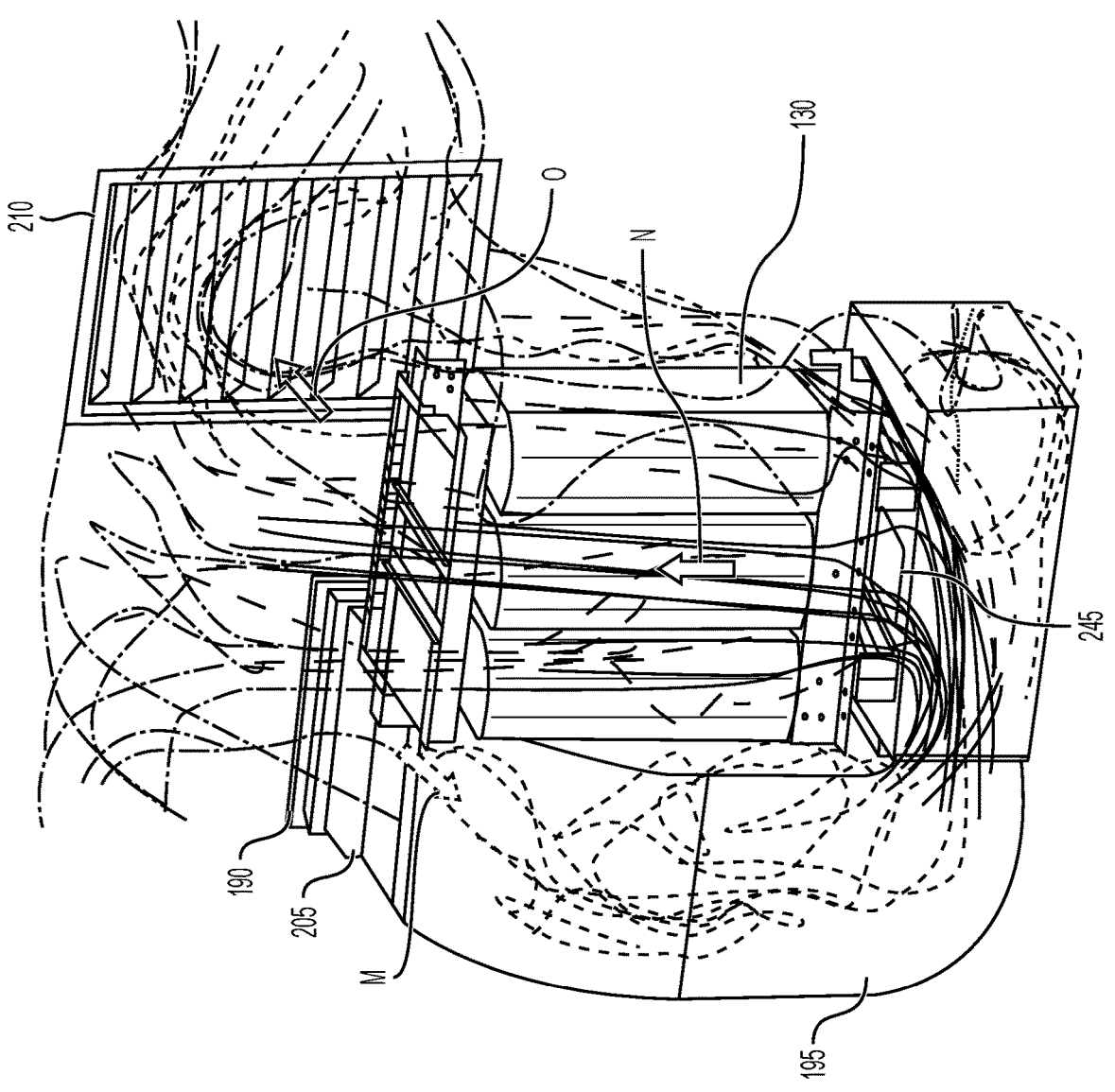
FIG. 6 shows a schematic view of air flow in an unconditioned space of the energy storage system shown in FIGS. 1 and 2.

FIG. 6 shows a schematic view of air flow from the intake louver 190 of the transformer bay 135, through the radiator 205 and an interior of the transformer bay 135, forming the unconditioned space 215, and through the transformer bay duct 195 and the exhaust louver 210. FIG. 6 also shows how the air flow in the transformer bay 135 varies in direction and in velocity. As in FIGS. 3 and 4, the air flow is represented by arrows, here, arrows M, N, and O, and a series of lines, including solid lines, long-dashed lines, short-dashed lines, dashed-dotted lines, and dotted lines (in order of order of decreasing air flow velocity), with arrows indicating the direction of the airflow. And, as with the air flow shown in FIGS. 3 and 4, the velocity of the air flow through the transformer bay 135 may vary based on locations and speeds of fans in the system, and based on a temperature of the air, which changes as the air flows through the transformer bay 135. For example, as the air flows across the transformer 130, a temperature of the air may increase due to heat exchange with the transformer 130 (that is, the air may absorb heat from the transformer 130, thereby cooling the transformer 130), and a velocity of the air flow at that point in time and at that location may increase. A velocity of the air also changes as the air moves near the inlet of the transformer bay duct 195 and is subject to a suction force of the transformer bay fans 200. As shown in FIG. 6, air within unconditioned space 215 may be drawn in through the intake louver 190 and the radiator 205 by a suction force of the transformer bay fans 200 (shown in FIGS. 2 and 5), and forced through the transformer bay duct 195 to the outlet 245, located below the transformer 130. The air rises, as shown by arrow N, as it mixes with heat output by the transformer 130, and is exhausted through the exhaust louver 210, as shown by arrow O.

The energy storage system 100 of the present disclosure may be scalable, in that multiple energy storage systems 100 may be provided in a parallel arrangement to provide increased power and energy capacity. An output voltage at the customer connections may also be maintained in light of the isolation transformer ratio. Alternatively, multiple energy storage systems 100 may be provided in a series arrangement to add voltage. The energy storage system 100 may also include one or more of a direct current (DC) and a shore power alternating current (AC) connection, a fire suppression system (FSS), a breaker, a door switch status, an Ethernet connection, a bus bar style connection, a bus bar with a waterfall option, and an emergency power off switch.

The FSS may include active systems for temperature monitoring of the transformer 130, the inverter 120, and the energy sources 110 and for shutting down of the inverter 120 in case of a fire, an off gas detection system, smoke and heat detection, aerosol fire retardant, an external fire alarm and manual pull station, and a dry water pipe with heat activated sprinkler heads. In some embodiments, the energy storage system 100 may be provided on a trailer, to be easily transported to and within worksites.

INDUSTRIAL APPLICABILITY

The energy storage system 100, including the cooling system 235, and the related method 700 may be used for an energy storage container that is a mobile system or a stationary system, on grid or off grid, and in various environments and ambient temperatures.

Figure 7:
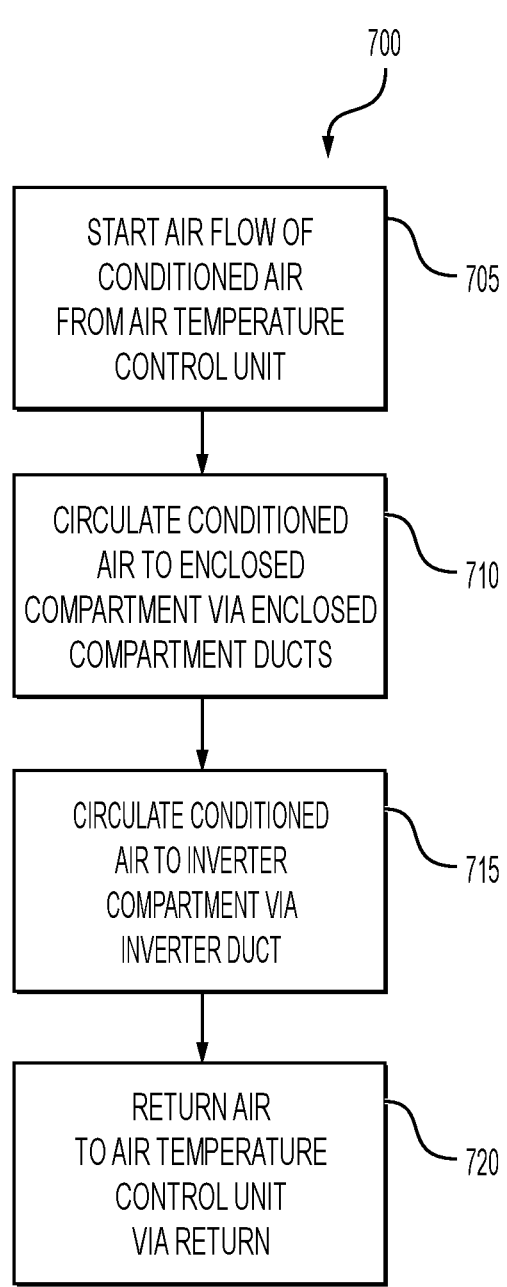
FIG. 7 shows a flowchart of a method of providing thermal management for an energy storage system, in accordance with the present disclosure.

FIG. 7 shows a flowchart of a method 700 of providing thermal management for an energy storage system 100, in accordance with the present disclosure. The method 700 may include a step 705 of starting the flow of conditioned air from the air temperature control unit 150. The method 700 may also include a step 710 of circulating the conditioned air from the air temperature control unit 150 through the one or more enclosed compartment ducts 160, to the enclosed compartment 115. In addition, the method 700 may include a step 715 of circulating the conditioned air through one or more inverter cabinet inlets 230 to the inverter 120. The circulating of the conditioned air from the air temperature control unit 150 may begin in the one or more enclosed compartment ducts 160, to the enclosed compartment 115, and may continue to the inverter cabinet inlets 230. In other words, the step 715 of circulating the conditioned air to the inverter cabinet 125, via the inlets 230, may occur after the step 710 of circulating the conditioned air to the enclosed compartment 115, via the one or more enclosed compartment ducts 160. In addition, the method 700 may include a step 720 of returning air that has passed through the energy sources 110 in the enclosed compartment 115, and air that has passed through the inverter cabinet 125 and is exhausted by the inverter exhaust duct 170, to the air temperature control unit 150 via the air temperature control unit return 240.

The energy storage system 100, the cooling system 235, and the related method 700, described below, provide for efficient cooling of an energy storage container 105, and, in particular, of an enclosed compartment 115 containing energy sources 110 and an inverter 120 within an inverter cabinet 125, to maintain the enclosed compartment 115 and the contents thereof below a temperature threshold, which may be useful when the energy storage system 100 is exposed to a wide range of ambient temperatures. And, by virtue of the gap above the storage racks 155 and below the enclosed compartment ducts 160, at least a portion of the air that has passed around and through the energy sources 110 (that is, heated air) recirculates within the enclosed compartment 115, resulting in entrainment of excess heated air, and allowing for better mixing of the heated air with conditioned air output by the enclosed compartment ducts, prior to reentry into cooled components, including the energy sources 110, and into the inverter cabinet 125. In addition, the energy storage system 100, the cooling system 235, and the related method 700 provide for efficient and effective thermal management of a transformer 130, located within a transformer bay 135 of the energy storage container 105, while allowing for use of a smaller transformer, or fewer transformers and maintaining an output voltage at the customer connections in light of the isolation transformer ratio. In particular, by virtue of the air temperature control unit 150, which cools the conditioned space 185 of the energy storage container 105, containing the energy sources 110 and the inverter 120, without needing to cool the transformer bay 135, it is possible to reduce a load, in terms of usage during a cooling process, of the air temperature control unit 150. The reduction of the load of the air temperature control unit 150 reduces the overall power consumption of the energy storage system 100, and increases the efficiency thereof. The effective cooling of the enclosed compartment 115 by the air temperature control unit 150, and the effective cooling of the transformer bay 135 using ambient air, help to reduce shutting down of or damage to the contents of those compartments, particularly the energy sources 110, the inverter 120, and/or the transformer 130, due to extreme temperatures. Also, the ability to use smaller and/or fewer transformers in the energy storage system 100 allows for an energy storage container 105 that may be smaller in size and in weight, and, as a result, an energy storage system 100 that is less expensive to manufacture and to ship. Providing several connections 140 to output power from the transformer 130 allows for more options for a user. In addition, the doors 145 providing access to the enclosed compartment 115 and the transformer bay 135 provide greater serviceability of the energy storage container 105.

It will be apparent to those skilled in the art that various modifications and variations can be made to the disclosed energy storage system 100, the cooling system 235, and the related method 700 of providing thermal management for an energy storage system 100, without departing from the scope of the disclosure. Other embodiments of the energy storage system 100, the cooling system 235, and the related method 700 will be apparent to those skilled in the art from consideration of the specification and the accompanying figures. It is intended that the specification, and, in particular, the examples provided herein be considered as exemplary only, with a true scope of the disclosure being indicated by the following claims and their equivalents.

We claim:

1. An energy storage system comprising:
   a storage container having:
      an enclosed compartment containing:
         one or more energy storage units and an enclosed compartment duct;
         an inverter cabinet containing an inverter, the inverter cabinet having one or more inverter cabinet inlets; and
         an inverter exhaust duct; and
      a transformer bay containing a transformer; and
   an air temperature control unit, attached to the storage container and configured to circulate conditioned air to the enclosed compartment via the enclosed compartment duct and to the inverter cabinet via the one or more inverter cabinet inlets, and to return air from the enclosed compartment and the inverter cabinet via an air temperature control unit return.

2. The energy storage system of claim 1, wherein the enclosed compartment forms a conditioned portion of the storage container, and the transformer bay forms an unconditioned portion of the storage container.

3. The energy storage system of claim 1, wherein circulating of the conditioned air from the air temperature control unit begins in the enclosed compartment duct, to the enclosed compartment, and continues to the one or more inverter cabinet inlets, and to the inverter cabinet, and
   wherein returning of the air from the enclosed compartment includes returning air exhausted by the inverter exhaust duct into the enclosed compartment and returned air that has circulated through the one or more energy storage units returns via the air temperature control unit return.

4. The energy storage system of claim 1, wherein the enclosed compartment duct is located on or near an upper surface of the enclosed compartment, the one or more inverter cabinet inlets are located on a side surface of the inverter cabinet, and the inverter exhaust duct is located on or near an upper surface of the inverter cabinet.

5. The energy storage system of claim 1, wherein the transformer bay includes an intake louver, for taking in air from outside of the storage container, and an exhaust louver, for exhausting air from the transformer bay.

6. The energy storage system of claim 1, wherein the storage container further includes one or more connections, provided on an exterior of the storage container, the one or more connections being configured to output power from the transformer.

7. The energy storage system of claim 1, wherein walls of the enclosed compartment are insulated.

8. A method of controlling a temperature of an energy storage system, the energy storage system comprising:
   a storage container having:
      an enclosed compartment containing:
         one or more energy storage units and an enclosed compartment duct;

an inverter cabinet containing an inverter, the inverter cabinet having one or more inverter cabinet inlets; and
      an inverter exhaust duct; and
   a transformer bay containing a transformer at a position laterally spaced from the enclosed compartment; and
   an air temperature control unit, attached to the storage container and configured to circulate conditioned air to the enclosed compartment via the enclosed compartment duct and to the inverter cabinet via the one or more inverter cabinet inlets, and to return air from the enclosed compartment and the inverter cabinet via an air temperature control unit return,
   the method comprising:
      starting flow of the conditioned air from the air temperature control unit;
      circulating the conditioned air through the enclosed compartment via the enclosed compartment duct such that the enclosed compartment duct receives the conditioned air and supplies the conditioned air to an interior of the enclosed compartment;
      circulating the conditioned air through the inverter cabinet via the one or more inverter cabinet inlets; and
      returning air that has passed through the one or more energy storage units in the enclosed compartment and air that has passed through the inverter cabinet and is exhausted by the inverter exhaust duct to the air temperature control unit via the air temperature control unit return.

9. The method of claim 8, wherein the enclosed compartment forms a conditioned portion of the storage container, and the transformer bay forms an unconditioned portion of the storage container.

10. The method of claim 8, wherein circulating of the conditioned air from the air temperature control unit begins in the enclosed compartment duct, to the enclosed compartment, and continues to the one or more inverter cabinet inlets, and to the inverter cabinet, and
   wherein returning of the air from the enclosed compartment includes returning air exhausted by the inverter exhaust duct into the enclosed compartment and returned air that has circulated through the one or more energy storage units returns via the air temperature control unit return.

11. The method of claim 8, wherein the enclosed compartment duct is located on or near an upper surface of the enclosed compartment, the one or more inverter cabinet inlets are located on a side surface of the inverter cabinet, and the inverter exhaust duct is located on or near an upper surface of the inverter cabinet.

12. The method of claim 8, wherein the transformer bay includes an intake louver, for taking in air from outside of the storage container, and an exhaust louver, for exhausting air from the transformer bay.

13. The method of claim 8, wherein the storage container further includes one or more connections, provided on an exterior of the storage container, the one or more connections being configured to output power from the transformer.

14. The method of claim 8, wherein walls of the enclosed compartment are insulated.

15. A cooling system for an energy storage system, the energy storage system having:
   an enclosed compartment containing one or more energy storage units and an inverter cabinet containing an inverter; and
   a transformer bay containing a transformer, the cooling system comprising:

an air temperature control unit, attached to the storage container and configured to output conditioned air and to return air from the enclosed compartment;

an enclosed compartment duct, located in the enclosed compartment near the one or more energy storage units, and configured to receive the conditioned air from the air temperature control unit;

one or more inverter cabinet inlets, located on a side of the inverter cabinet and configured to receive the conditioned air from the air temperature control unit;

an inverter exhaust duct, located above the inverter cabinet, and configured to exhaust air from within the inverter cabinet back into the enclosed compartment; and an air temperature control unit return, configured to return air that has circulated through the one or more energy storage units in the enclosed compartment and air output by the inverter exhaust duct to the air temperature control unit.

16. The cooling system of claim 15, wherein the enclosed compartment forms a conditioned portion of the storage container, and the transformer bay forms an unconditioned portion of the storage container.

17. The cooling system of claim 15, wherein the conditioned air from the air temperature control unit reaches the enclosed compartment first, and then flows to the inverter cabinet second.

18. The cooling system of claim 15, further comprising an intake louver provided in the transformer bay, for taking in air from outside of the storage container, and an exhaust louver provided in the transformer bay, for exhausting air from the transformer bay.

19. The cooling system of claim 15, wherein the storage container further includes one or more connections, provided on an exterior of the storage container, the one or more connections being configured to output power from the transformer.

20. The energy storage system of claim 1, wherein the enclosed compartment duct receives the conditioned air from the air temperature control unit, and supplies the condition air to an interior of the enclosed compartment, and wherein the transformer bay is separate from the enclosed compartment.

* * * * *